United States Patent
Dusan et al.

(10) Patent No.: US 10,303,436 B2
(45) Date of Patent: May 28, 2019

(54) ASSISTIVE APPARATUS HAVING ACCELEROMETER-BASED ACCESSIBILITY

(71) Applicant: Apple Inc., Cupertino, CA (US)

(72) Inventors: Sorin V. Dusan, San Jose, CA (US); Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 15/269,920

(22) Filed: Sep. 19, 2016

(65) Prior Publication Data

US 2018/0081621 A1    Mar. 22, 2018

(51) Int. Cl.
| | |
|---|---|
| G06F 3/0346 | (2013.01) |
| G06F 3/0484 | (2013.01) |
| G06F 3/16 | (2006.01) |
| G06F 9/451 | (2018.01) |
| H04R 1/10 | (2006.01) |

(52) U.S. Cl.
CPC ............ *G06F 3/167* (2013.01); *G06F 3/0346* (2013.01); *G06F 9/453* (2018.02); *H04R 1/1041* (2013.01); *G06F 3/04842* (2013.01); *G06F 2203/04806* (2013.01); *H04R 1/1016* (2013.01)

(58) Field of Classification Search
CPC .................................... A61F 4/00; A61F 5/58
USPC .......................................... 715/761–765, 841
See application file for complete search history.

(56) References Cited

U.S. PATENT DOCUMENTS

| | | | |
|---|---|---|---|
| 8,494,507 B1* | 7/2013 | Tedesco | A61F 4/00 |
| | | | 434/112 |
| 2009/0245532 A1 | 10/2009 | Hupkes et al. | |
| 2014/0330557 A1* | 11/2014 | Huber | A61F 5/58 |
| | | | 704/225 |
| 2014/0364967 A1 | 12/2014 | Sullivan | |
| 2015/0179189 A1 | 6/2015 | Dadu et al. | |

FOREIGN PATENT DOCUMENTS

EP          2277301 A1      4/2009

* cited by examiner

*Primary Examiner* — Cao H Nguyen
(74) *Attorney, Agent, or Firm* — Womble Bond Dickinson (US) LLP (57) ABSTRACT

An assistive apparatus, and a method of providing an accessibility switch output by the assistive apparatus, is described. The assistive apparatus may include an accelerometer to be worn in an ear canal of a user, and a display having a graphical user interface. The accelerometer may generate an input signal representing an input command made by the user, and more particularly, the generated input command may represent one or more hums transmitted from vocal cords of the user to the accelerometer in the ear canal via bone conduction. The assistive apparatus may provide an accessibility switch output in response to the input signals representing the input command. For example, the accessibility switch output may cause a selection of a user interface element of the graphical user interface. Other embodiments are also described and claimed.

20 Claims, 7 Drawing Sheets

| Input Command | | Accessibility Switch Output |
| --- | --- | --- |
| Hum | Tilt | |
| Single Short | Right | Select |
| Single Short | Left | Deselect |
| Single Long | None | Advance |
| Short + High | None | Zoom In |
| Long + Low | None | Zoom Out |

FIG. 8

ASSISTIVE APPARATUS HAVING ACCELEROMETER-BASED ACCESSIBILITY

BACKGROUND

Field

Embodiments related to assistive apparatuses, such as accessible electronic devices, are disclosed. More particularly, embodiments related to assistive apparatuses having accessibility switch controls, are disclosed.

Background Information

Accessibility controls allow users, such as users with impaired physical and motor skills, to perform tasks on an electronic device. Accessibility controls may include voice recognition features to allow a user to control the electronic device with verbal commands. Also, a variety of switch hardware, such as physical buttons, may be connected to the electronic device to allow the user to navigate through onscreen items using unspoken commands. For example, a normally-open switch having a button may be placed on a headrest of a wheelchair behind a head of a user to allow the user to select an onscreen item by tapping against the button with the user's head to send a closed switch signal to the electronic device.

SUMMARY

Accessibility controls that use verbal commands as inputs, e.g., speech recognition features using microphone signals as inputs, may not function seamlessly in noisy environments. For example, ambient noises may interfere with the intended verbal commands, causing the accessibility controls to misbehave. Similarly, switch hardware may not be well-suited to all users. For example, some individuals may not be able to speak, e.g., due to a severe impairment of physical and motor skills. Similarly, paralyzed individuals may be unable to actuate a physical button to input a command to the electronic device. For these reasons, current assistive technology would benefit from an accessibility control that is more robust to ambient acoustic noises and may be used by individuals with severe impairment of physical and motor skills.

In an embodiment, an assistive apparatus includes accelerometer-based accessibility features to perform an accessibility method. For example, an assistive apparatus having accelerometer-based accessibility may include an earphone configured to be worn in an ear canal of a user. The earphone may include an accelerometer configured to generate one or more input signals representing an input command from the user. The input command includes one or more hums made by the user. Each hum includes a wordless tone transmitted via bone conduction from vocal cords of the user to the earphone in the ear canal. The assistive apparatus may include a display configured to display a graphical user interface having a user interface element. The assistive apparatus may include a memory storing an operating system having an accessibility module configured to map the one or more input signals corresponding to the input command to an accessibility switch output. The assistive apparatus may include a processor configured to receive the one or more input signals generated by the accelerometer, and execute the accessibility module to map the one or more input signals to the accessibility switch output. Accordingly, the processor may provide the accessibility switch output to cause the assistive apparatus to perform an operation on the user interface element.

The hums of the input command may have audible characteristics. For example, each hum may have a respective frequency and a respective duration, and the respective frequency may be constant over the respective duration. By way of example, the respective frequencies may be less than 1 kHz, and the respective durations may be of 100 milliseconds or more. The input command may include a combination of a plurality of hums. Furthermore, the input command may include non-audible characteristics. For example, the input command may include a tilt of the head, and consequently the ear canal, of the user. Accordingly, the input command may include a combination of accelerometer bone conduction vibration signals from humming and accelerometer orientation signals from head tilting to generate a complex switching command.

In an embodiment, an accessibility method includes displaying, by a display of an assistive apparatus, a graphical user interface having a user interface element. The method includes receiving, by a processor of the assistive apparatus, one or more input signals generated by an accelerometer of the assistive apparatus. For example, the accelerometer may be placed in an ear canal of a user to generate input signals when the user makes an input command. For example, the input command may include one or more hums by the user. The processor of the assistive apparatus may determine the input command represented by the one or more input signals by determining that the one or more input signal represent one or more hums by the user. The method includes providing an accessibility switch output, by the processor in response to the one or more input signals. The accessibility switch output may correspond to the determined input command, and may cause the assistive apparatus to perform an operation on the user interface element. For example, the operation may include one or more of selecting the user interface element, magnifying the user interface element on the display, or advancing a cursor from the user interface element to a second user interface element of the graphical user interface.

Determining the input command may include determining that the input signals represent a combination of audible and non-audible inputs. For example, the combination may include audible inputs such as a first hum having a first pitch, and a second hum having a second pitch lower than the first pitch. Alternatively, the combination may include a first hum having a first duration, and a second hum having a second duration longer than the first duration. The combination may also include non-audible inputs such as a tilt of the head of the user.

The accessibility method may be performed by the assistive apparatus using instructions executed by a processor. For example, the assistive apparatus may include a memory storing an operating system having an accessibility module executable by the processor. The accessibility module may be configured to map an input signal from the accelerometer to an accessibility switch output, and thus, the processor may execute the accessibility module to cause the assistive apparatus to perform the operation. In an embodiment, the accessibility module includes instructions stored on a non-transitory machine-readable storage medium.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Embodiments describe an assistive apparatus, and a method of providing an accessibility switch output to control operations by the assistive apparatus. The assistive apparatus may include an accelerometer mounted in an ear canal of a user, and a computer system, such as a desktop computer, laptop computer, a tablet computer, a mobile device, or a wearable computer. The assistive apparatus may, however, be incorporated into other applications, such as a medical device or a motor vehicle, to name only a few possible applications.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "over" may indicate a first direction away from a reference point. Similarly, "under" may indicate a location in a second direction orthogonal to the first direction. Such terms are provided to establish relative frames of reference, however, and are not intended to limit the use or orientation of an assistive apparatus to a specific configuration described in the various embodiments below.

In an aspect, an assistive apparatus includes accelerometer-based accessibility features. For example, the assistive apparatus may include a wireless-enabled or wired headset having an accelerometer configured to be worn in an ear canal of a user, and to detect vibrations signals transmitted via bone conduction from vocal cords of the user to the ear canal when the user hums. The humming may have audible characteristics, such as a pitch and duration, and the accelerometer may generate input signals corresponding to the audible characteristics. Accordingly, the input signals may represent a combination of hums, e.g., a pair of short hums, and the input signals may be provided to a processor of the assistive apparatus. The processor may output an accessibility switch signal based on the input signals from the accelerometer to cause the assistive apparatus to perform operations, such as manipulating a graphical user interface.

Figure 1:
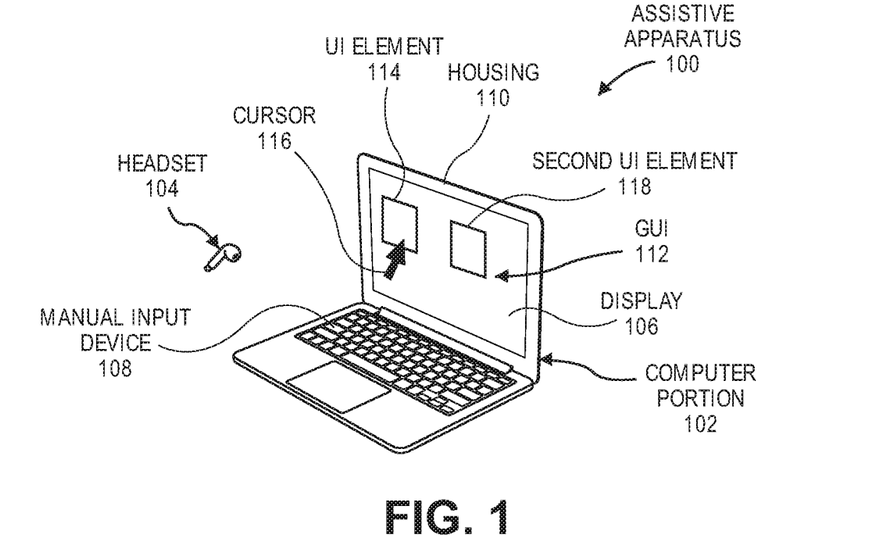
FIG. 1 is a perspective view of an assistive apparatus, in accordance with an embodiment.

Referring to FIG. 1, a perspective view of an assistive apparatus is shown in accordance with an embodiment. Assistive apparatus 100 may be an electronic device or system having accelerometer-based accessibility, as described below. Assistive apparatus 100 may include a computer portion 102, such as a laptop computer, and a headset 104, such as an earphone. In an embodiment, computer portion 102 includes a display 106 and a manual input device 108 integrated in a housing 110. For example, manual input device 108 may include an alphanumeric input, a touchpad, etc.

Manual input device 108 may allow a user to control a graphical user interface 112 on display 106. That is, display 106 may present graphical user interface 112 to the user, and the user may use manual input device 108 to interact with assistive apparatus 100 through one or more user interface elements 114 of graphical user interface 112. For example, the user may manipulate manual input device 108, e.g., a touchpad, to select a user interface element 114, to magnify user interface element 114, or to advance a cursor 116 from user interface element 114 to a second user interface element 118 of graphical user interface 112.

In an embodiment, assistive apparatus 100 allows a user to manipulate graphical user interface 112 through accessibility features. For example, the user may input commands to computer portion 102 using headset 104, which is communicatively coupled to computer portion 102 by a wired or wireless connection. More particularly, headset 104 may detect input commands and provide input signals corresponding to the commands to computer portion 102. Computer portion 102 may process the input signals to provide accessibility switch outputs used to manipulate graphical user interface 112. As described below, the input commands detected by headset 104 may be non-verbal, i.e., may not include spoken words.

Figure 2:
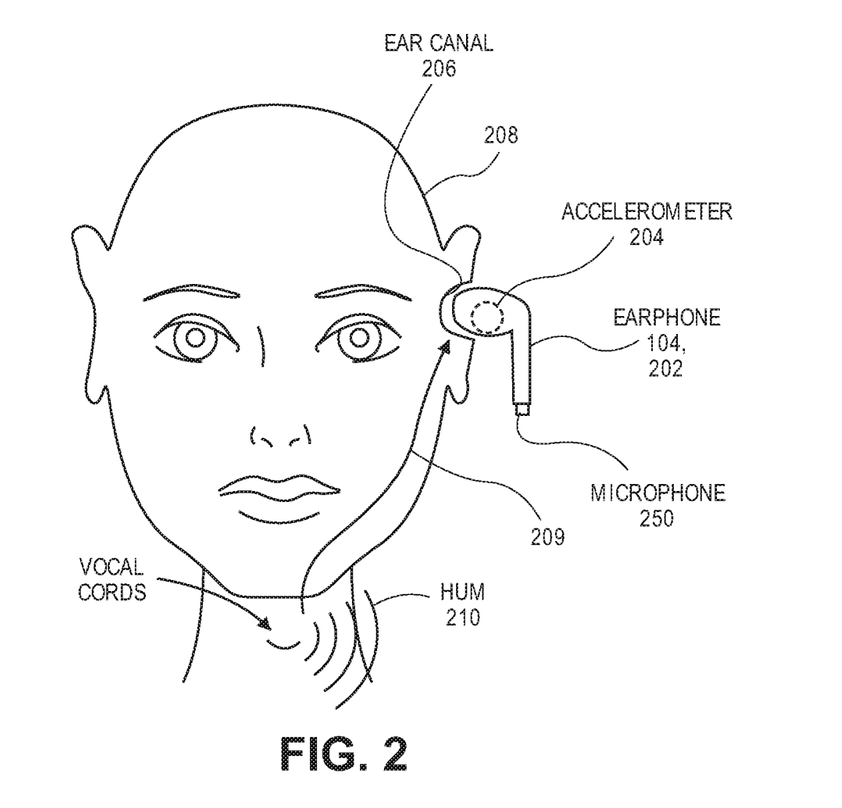
FIG. 2 is a pictorial view of a headset having an accelerometer placed in an ear canal of the user, in accordance with an embodiment.

Referring to FIG. 2, a pictorial view of a headset having an accelerometer placed in an ear canal of the user is shown in accordance with an embodiment. Headset 104 of the assistive apparatus 100 may include an earphone 202 having an electrical vibration sensing element. The vibration sensing element may be an inertial sensor, such as an accelerometer 204. Accelerometer 204 may be integrated into a housing of earphone 202. Furthermore, earphone 202 may be worn in an ear canal 206 of a user 208, and thus, accelerometer 204 may be sensitive to an orientation of ear canal 206 and vibrations transmitted to ear canal 206. More particularly, accelerometer 204 may measure acceleration of a proof mass (not shown) and output an electrical signal that is representative of the acceleration. Accordingly, vibrations transmitted to ear canal 206 may be detected by earphone 202. The electrical signal representing the detected vibrations and/or orientation of earphone 202 in ear canal 206 may be communicated as an analog signal or a digital signal to computer portion 102, through either a wired or a wireless connection.

In an embodiment, the vibrations detected by accelerometer 204 in ear canal 206 are transmitted to earphone 202 from vocal cords of user 208 via bone conduction 209. More particularly, when user 208 makes a hum 210, vibrations from the humming resonate through the skull of the user. The vibrations, i.e., bone conduction vibrations, may be thus transmitted from the vocal cords of user 208 to ear canal 206, and through an ear canal wall, to the earphone housing and accelerometer 204. Hum 210 may be distinguished from a verbal sound, i.e., normal speech, of user 208. For example, hum 210 may include a wordless tone generated by vibrations of the vocal cords. More particularly, the wordless tone may be a sound forced to emerge from the nose of user 208. As described below, such sounds differ from verbal sounds at least in part because hum 210 is monotone or includes slightly varying tones. Therefore, humming may be less susceptible to distortion by ambient noise or differences in user vocalization as compared to verbal sounds because the sensed vibrations are transmitted directly through tissue of the user.

In an embodiment, headset 104 may further include a microphone 250 to receive a voice of user 208. For example, headset 104 may be worn by user 208 with the microphone 250 located near the user's mouth such that the voice is input to the microphone 250 for subsequent conversion into an electrical voice signal. The electrical voice signal may be further processed to provide a voice-centric application, such as telephony or speech recognition functionality of assistive apparatus 100.

Figure 3:
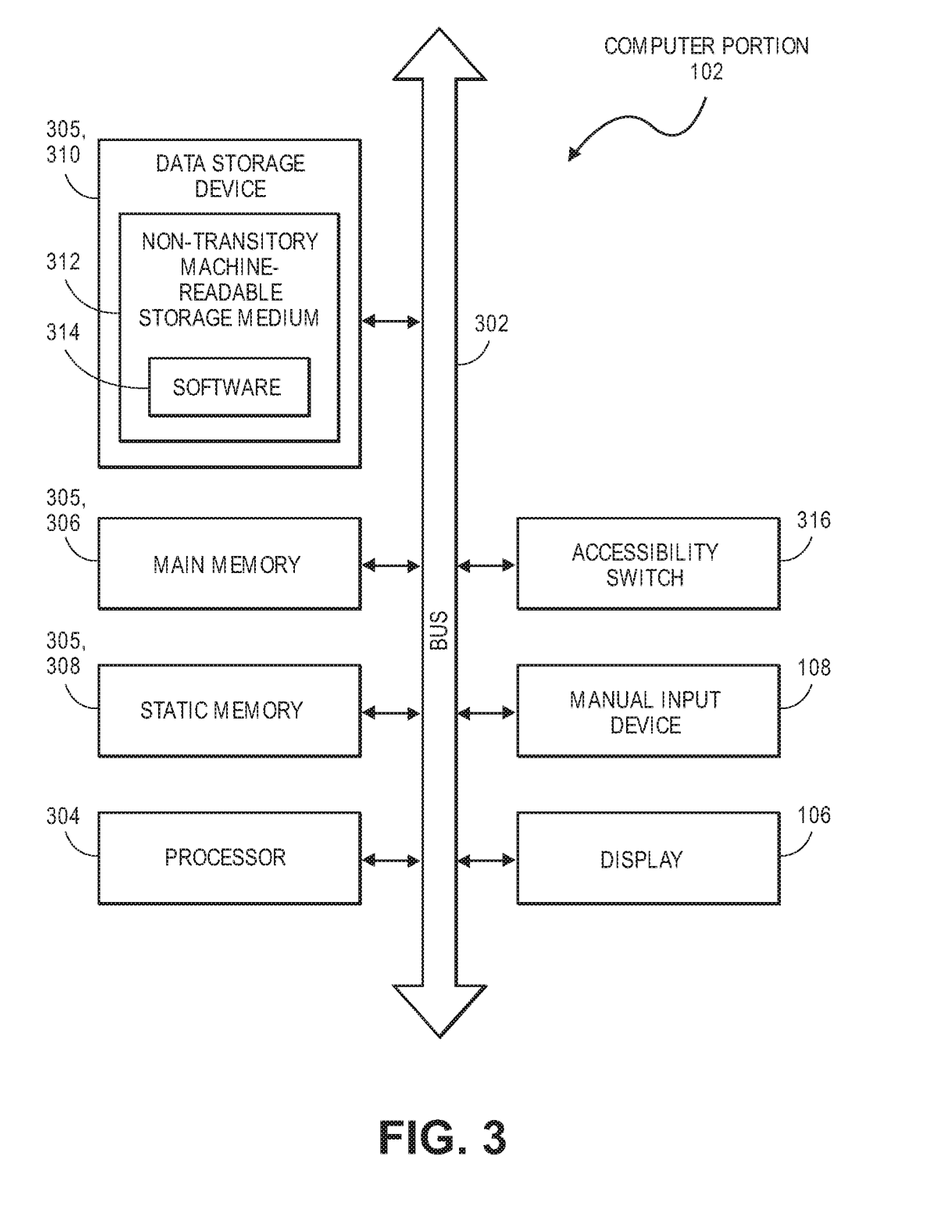
FIG. 3 is a block diagram of a computer portion of an assistive apparatus, in accordance with an embodiment.

Referring to FIG. 3, a block diagram of a computer portion of an assistive apparatus is shown in accordance with an embodiment. Computer portion 102 may have a processing system that includes the illustrated system architecture. Certain standard and well-known components which are not germane to the present invention are not shown. Processing system may include an address/data bus 302 for communicating information, and one or more processors 304 coupled to bus 302 for processing information and instructions. More particularly, processor 304 may be configured to receive input signals from accelerometer 204, execute an accessibility module, and provide an accessibility switch output, as described below.

Processing system may also include data storage features such as a memory 305 storing the accessibility module executable by processor(s) 304. Memory 305 may include a main memory 306 having computer usable volatile memory, e.g., random access memory (RAM), coupled to bus 302 for storing information and instructions for processor(s) 304, a static memory 308 having computer usable non-volatile memory, e.g., read only memory (ROM), coupled to bus 302 for storing static information and instructions for the processor(s) 304, or a data storage device 310 (e.g., a magnetic or optical disk and disk drive) coupled to bus 302 for storing information and instructions. Data storage device 310 may include a non-transitory machine-readable storage medium 312 storing one or more sets of instructions executable by processor(s) 304. For example, the instructions may be software 314 including software applications, such as the accessibility module. In an embodiment, software 314 includes an operating system of assistive apparatus 100, and the accessibility module is incorporated in operating system as an accessibility feature of the operating system. Accordingly, input signals from accelerometer 204 may be communicated to processor(s) 304 for processing according to the operating system and/or accessibility module of assistive apparatus 100. Software 314 may reside, completely or at least partially, within main memory 306, static memory 305, and/or within processor(s) 304 during execution thereof by processing system. More particularly, main memory 306, static memory 305, and processor(s) 304 may also constitute non-transitory machine-readable storage media.

Assistive apparatus 100 of the present embodiment includes input devices for receiving active or passive input from a user. For example, manual input device 108 may include alphanumeric and function keys coupled to bus 302 for communicating information and command selections to processor(s) 304. Manual input device 108 may include input devices of various types, including a keyboard device, a touchscreen devices, a touchpad, a microphone integrated in a headset, or a voice activation input device, to name a few types. Assistive apparatus 100 may also include an accessibility switch 316 coupled to bus 302 for communicating user input information and command selections to processor(s) 304. For example, accessibility switch 316 may include headset 104 having accelerometer 204. Input signals from accessibility switch 316 may be communicated to bus 302 through wired and/or wireless connections. For example, headset 104 may be a Bluetooth-enabled headset to communicate input signals to computer portion 102 wirelessly. Display 106 of assistive apparatus 100 may be coupled to bus 302 for displaying graphical user interface 112 to user 208.

Figure 4:
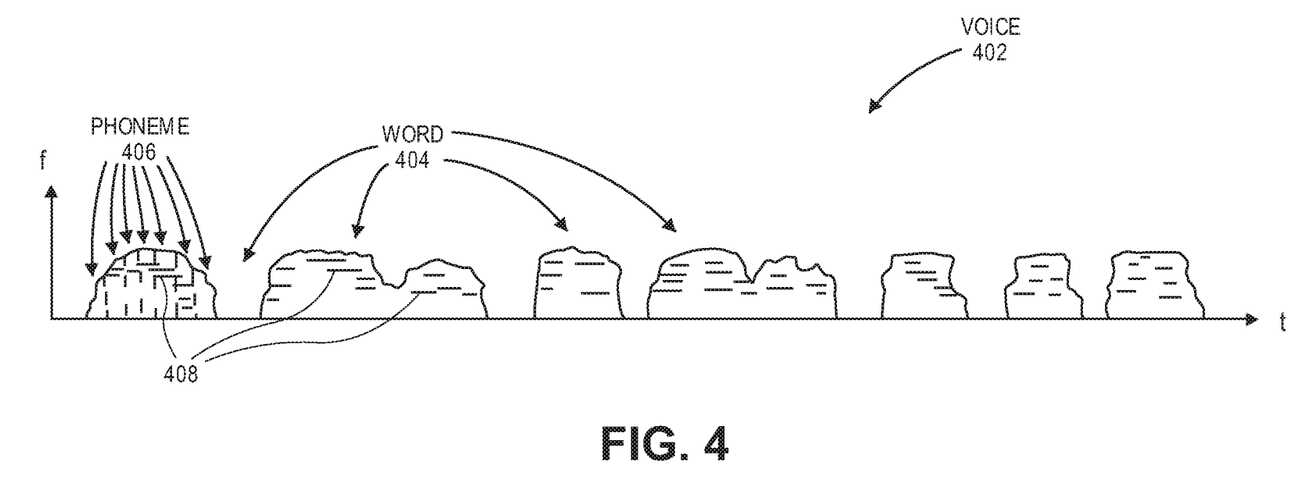
FIG. 4 is a visual representation of vibration signals transmitted via bone conduction from vocal cords to an accelerometer in an ear canal during normal speech by a user, in accordance with an embodiment.

Referring to FIG. 4, a visual representation of vibration signals transmitted via bone conduction from vocal cords to an accelerometer in an ear canal during normal speech by a user is shown in accordance with an embodiment. The visual representation is a spectrogram of the vibration signals transmitted via bone conduction 209. The spectrogram represents the spectrum of frequencies of a voice 402 plotted against time. That is, when headset 104 is located inside of ear canal 206, accelerometer 204 generates electrical bone conduction vibration signals corresponding to each word 404 spoken by user 208. The spectrogram indicates that for each word 404, a wide variation of harmonic tones 408 is present. For example, each word 404 may include several phonemes 406 having respective durations and tones 408. That is, each phoneme 406 in a spoken language that generally has a duration of about 90 milliseconds may include a fundamental tone and its harmonics having one or more corresponding predominant frequencies and amplitudes. The term predominant is used to indicate that a frequency has an amplitude or intensity that is significantly higher than other adjacent frequencies of the tone or harmonics of the tone. Notably, since voice 402 consists of spoken words 404 having respective phoneme combinations, spectrogram may or may not have a constant tone or frequency for longer than one phoneme because the voiced phonemes may be followed by unvoiced phonemes.

Figure 5A:
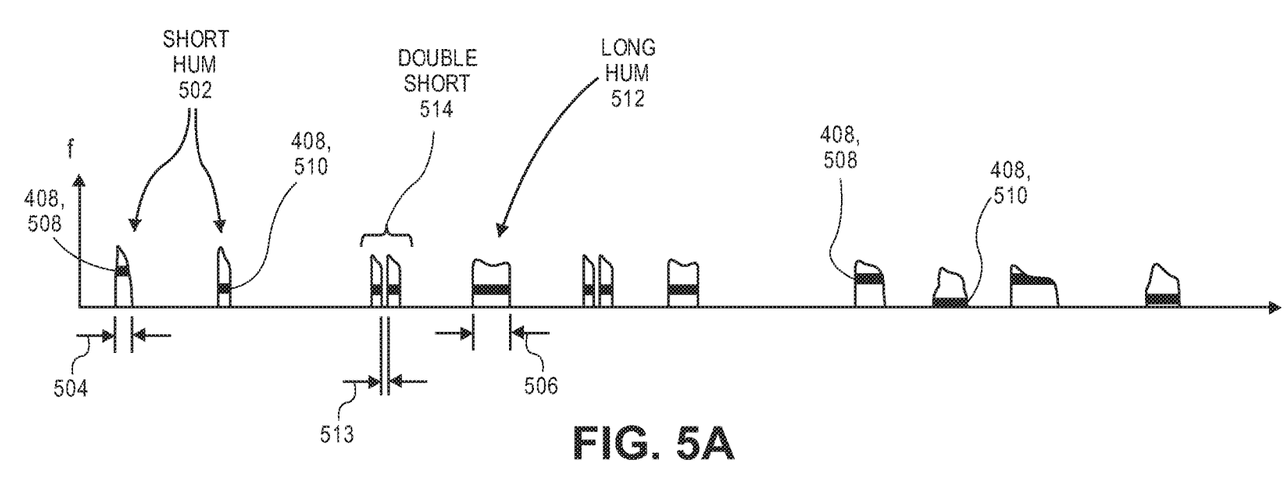
FIGS. 5A-5B are visual representations of vibration signals transmitted via bone conduction from vocal cords to an accelerometer in an ear canal during humming by a user, in accordance with an embodiment.

Referring to FIG. 5A, a visual representation of vibration signals transmitted via bone conduction from vocal cords to an accelerometer in an ear canal during humming by a user is shown in accordance with an embodiment. The black horizontal bars represent the fundamental frequency of the hums. For clarity, the harmonics are not represented but instead the figure represents the envelope energy around these hums. User 208 may provide an input command to assistive apparatus 100 by purposefully making one or more hums having predetermined audible characteristics and/or combinations. For example, the input command may include one or more hums transmitted via bone conduction 209 from vocal cords of the user 208 to accelerometer 204 in ear canal 206. Accelerometer 204 may detect the input command and generate input signals corresponding to the input command. That is, accelerometer 204 may generate one or more input signals representing the input command. For example, accelerometer 204 may output electrical bone conduction vibration signals corresponding to the respective fundamental frequencies and durations of hums.

The input command containing one or more hums may be represented by a spectrogram, which includes the respective fundamental frequencies of each hum 210 plotted against time. The spectra of fundamental vocal cord vibration for humming is usually above about 80 Hz for males, above 160 Hz for females, and even higher for children. That is, a predominant fundamental tone 408 of each hum 210 may have strong harmonics up to about 1 kHz in the accelerometer signal from ear canal. Accordingly, assistive apparatus 100 may detect input signals from accelerometer 204 corresponding to bone conducted vibrations having frequencies less than 1 kHz. Such a detection cutoff may provide good detectability for humming, however, the cutoff may be too low to detect the full range of vibrations inherent in voice 402. For example, tones having predominant frequencies above 1 kHz may be common for voice 402. Accordingly, non-verbal input commands from user 208 may be effectively detected by assistive apparatus 100 using less signal processing bandwidth than may be required for voice recognition software.

Notably, the spectrogram of accelerometer signals corresponding to humming may also differ from the spectrogram of accelerometer signals corresponding to speech in that each hum 210 may have a respective frequency that remains constant over a duration of the hum 210. More particularly, whereas each word 404 of voice 402 includes phonemes 406 having different predominant frequencies that change over an entire duration of the word 404, each hum 210 may have a respective tone 408 with a predominant frequency that remains constant over the entire duration of the hum 210. By way of example, the humming may include one or more short hums 502. Each short hum 502 may have a respective fundamental tone 408. For example, a first short hum 502 may include tone 408 having a high pitch 508, and a second short hum 502 may include tone 408 having a low pitch 510. In an embodiment, the respective frequencies of each hum may be determined by comparison. For example, low pitch 510 of the second hum may be lower than high pitch 508 of the first hum. Alternatively, the different pitches may be determined with respect to a predetermined or personalized threshold. For example, any hum 210 having a predominant fundamental frequency higher than a predetermined frequency may be considered to have a high pitch, and any hum 210 having a predominant frequency lower than the predetermined frequency may be considered to have a low pitch.

As described above, a frequency cutoff may be established above which a bone conduction vibration is not considered to be an input command. More particularly, respective frequencies of the one or more hums determined to be an input command from user 208 may be less than 1 kHz. Such a cutoff may nonetheless capture the range of hum frequencies made by prospective users, and may be less than a cutoff used by speech recognition software to capture a range of vocalizations made by such users. In addition to sampling bone conduction vibrations below a predetermined cutoff, assistive apparatus 100 may have a minimum duration over which tone 408 must remain constant for the detected vibration to be considered to be an input command, i.e., a hum. By way of example, the input command from user 208 may include hums having a constant frequency over a predetermined duration. The predetermined duration may be greater than a typical phoneme length. For example, the predetermined duration may be more than 100 milliseconds. That is, hums 210 having constant predominant frequencies over a duration of more than 100 milliseconds may be counted as input commands.

Still referring to FIG. 5A, a sequence of input commands by user 208 may include a long hum 512. In an embodiment, the respective durations of each hum may be determined by comparison. For example, long duration 506 of long hum 512 may be longer than short duration 504 of short hum 502. Alternatively, the different durations may be determined with respect to a predetermined threshold. For example, any hum 210 having a duration longer than a predetermined duration may be considered to be a long hum 512, and any hum 210 having a duration shorter than the predetermined duration may be considered to be a short hum 502. Thus, the length of a constant tone 408 to trigger a recognition of an input command signal may be customized. For example, a respective duration of all short hums 502 may be in a range of 100-400 milliseconds, and a respective duration of all long hums 512 may be in a range greater than 400 milliseconds.

The input command from user 208 may include a combination of several hums. That is, rather than being a single short hum 502 or a single long hum 512, combinations of several hums may be detected as the input command. The input command may include a double short hum 514 having two individual short hums separated by a gap 513, i.e., a period of time having no tone. Gap 513 may have a predetermined maximum duration. For example, the predetermined maximum duration may be 400 milliseconds, i.e., any two or more hums made within 400 milliseconds of each other may be considered to be a set of hums, and the set of hums may be treated as a distinct input command. The sets of hums may be mapped to an input command, which may include a double short hum, a double long hum, a single short hum in conjunction with a single long hum, etc. More particularly, an input command may include a set of one or more hums having any combination of hums having respective audible characteristics.

Figure 5B:
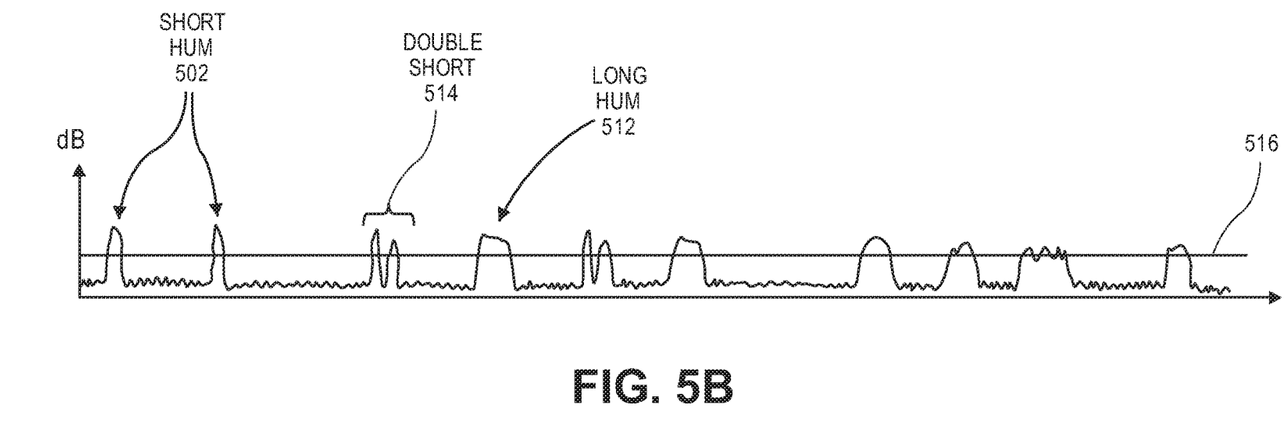

Referring to FIG. 5B, a visual representation of vibration signals transmitted via bone conduction from vocal cords to an accelerometer in an ear canal during humming by a user is shown in accordance with an embodiment. An audio power of each hum 210 made by user 208 may also be used as an audible characteristic to qualify the hums for consideration as an input command. More particularly, even when the gap 513 between hums is not toneless, e.g., when accelerometer 204 detects ambient vibrations by virtue of user 208 standing or sitting on a moving surface, the hums may be distinguished from the ambient vibrations based on the audio power being above a power threshold 516. Power threshold 516 may be a predetermined parameter. By way of example, power threshold 516 may be set at a level of 30 dB, i.e., any hum 210 generating an accelerometer output power (an audio power) greater than 30 dB may be detected as being a portion of an input command.

Figure 6:
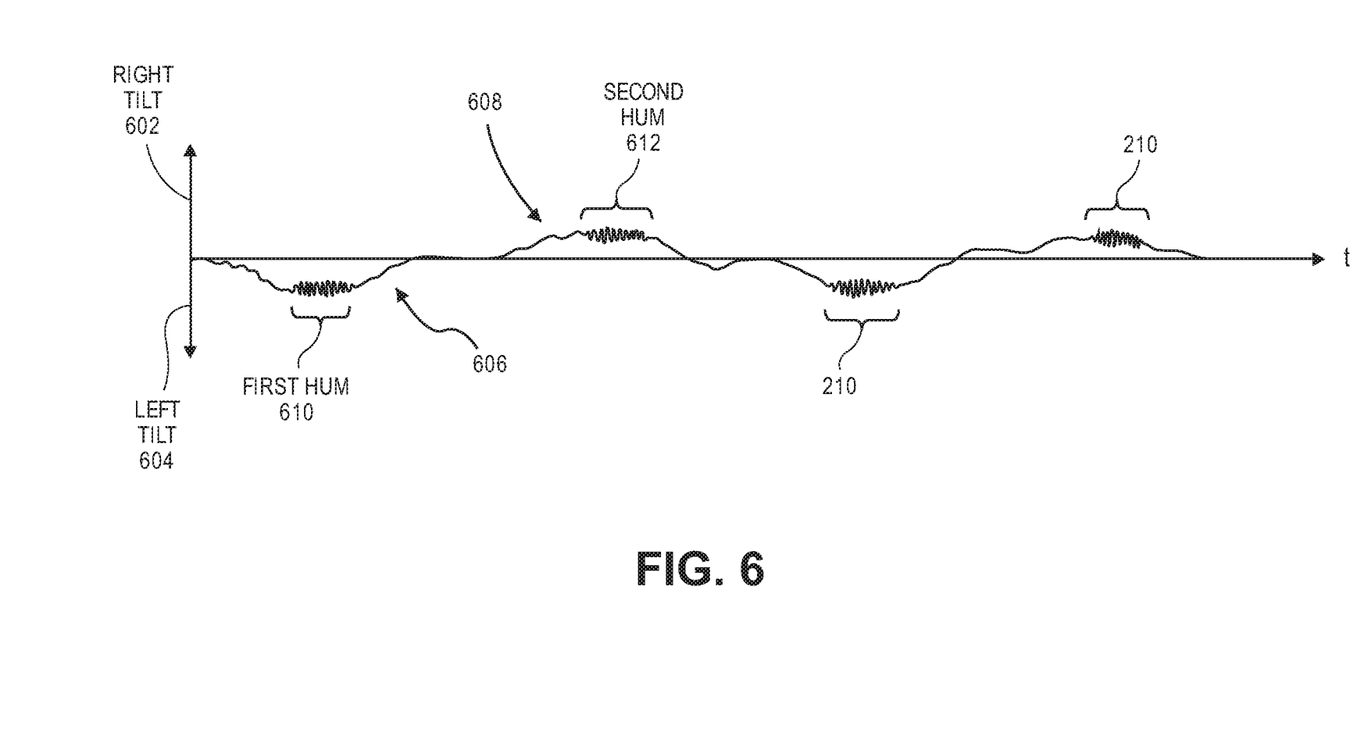
FIG. 6 is a visual representations of orientation signals of an accelerometer in an ear canal, and vibration signals transmitted via bone conduction from vocal cords to the accelerometer during humming by a user, in accordance with an embodiment.

Referring to FIG. 6, a visual representation of orientation signals of an accelerometer in an ear canal, and vibration signals transmitted via bone conduction from vocal cords to the accelerometer during humming by a user is shown in accordance with an embodiment. The input command from user 208 may include a tilt of the head and consequently of the ear canal 206. That is, accelerometer 204 may detect a change in orientation when user 208 tilts his head to the side. Accelerometer 204 may generate orientation signals corresponding to the spatial orientation of earphone 202, and thus, the head tilting may be detected as a portion of the input command by user 208. By way of example, orientation signals indicating a change in orientation of earphone 202 relative to a vertical plane may indicate a right tilt 602, when the change in orientation is to a right side of the vertical plane, or a gravity vector, and may indicate a left tilt 604, when the change in orientation is to a left side of the vertical plane.

A first tilt 606 to the left side of the vertical plane may indicate a portion of the user 208 command. Similarly, a second tilt 608 to a right side of the vertical plane may indicate a portion of a same or different user command. More particularly, individual head tilts may be combined into a set of head tilts, similar to the set of hums described above. Orientation signals may also be combined with hum signals to generate complex switches. For example, a first hum 610 may be made by user 208 during first tilt 606 to represent a first user command, and a second hum 612 may be made by the user during second tilt 608 to represent a second user 208 command. Accordingly, an input command may include a combination of vibration and orientation signals detectable by accelerometer 204. That is, accelerometer 204 may generate input signals representing a combination of vibration and orientation signals, and the vibration and orientation signals may represent the input command. The vibration signals may include one or more hums, each hum 210 having an audio power above a predetermined power threshold 516, and each hum 210 having a respective frequency and duration. Similarly, the orientation signals may be representative of one or more head tilts. The input command may be defined as the combination of audible characteristics of the hums and non-audible volitional movements of the head. That is, head tilt signals, tonal signals, audio power signals, hum duration signals, and other related signals may be purposefully made by user 208 to generate a complex switch. For example, user 208 may move his head to the left while humming a set including a first hum having short duration 504 and high pitch 508 and a second hum 210 having long duration 506 and low pitch 510, to generate a 5 bit data input (corresponding to the tilt, first hum pitch, first hum duration, second hum pitch, and second hum duration). Accordingly, it will be appreciated that a large number of input commands may be represented by combinations of non-verbal inputs to accelerometer 204 in ear canal 206.

The combinations of bone conduction vibration inputs and/or orientation inputs may be trained by user 208. For example, an accessibility module of assistive apparatus 100 may allow user 208 to run a training loop that measures, specifically for the user, what is to be detected as a long hum, a short hum, a high pitch, a low pitch, etc. By way of example, the accessibility module may provide cues to user 208 requesting the user to "make a high-pitched hum." The user 208 may then hum accordingly, and the accessibility module may measure a predominant frequency of the hum to determine a frequency threshold above which hums are to be considered as having a high pitch. Such training segments may be repeated several times to allow accessibility module to analyze average audible characteristics of the user's specific humming. Thus, user-specific input signals corresponding to pre-trained input commands may be recognized and mapped to predetermined accessibility switch outputs to control graphical user interface 112 of assistive apparatus 100.

Figure 7:
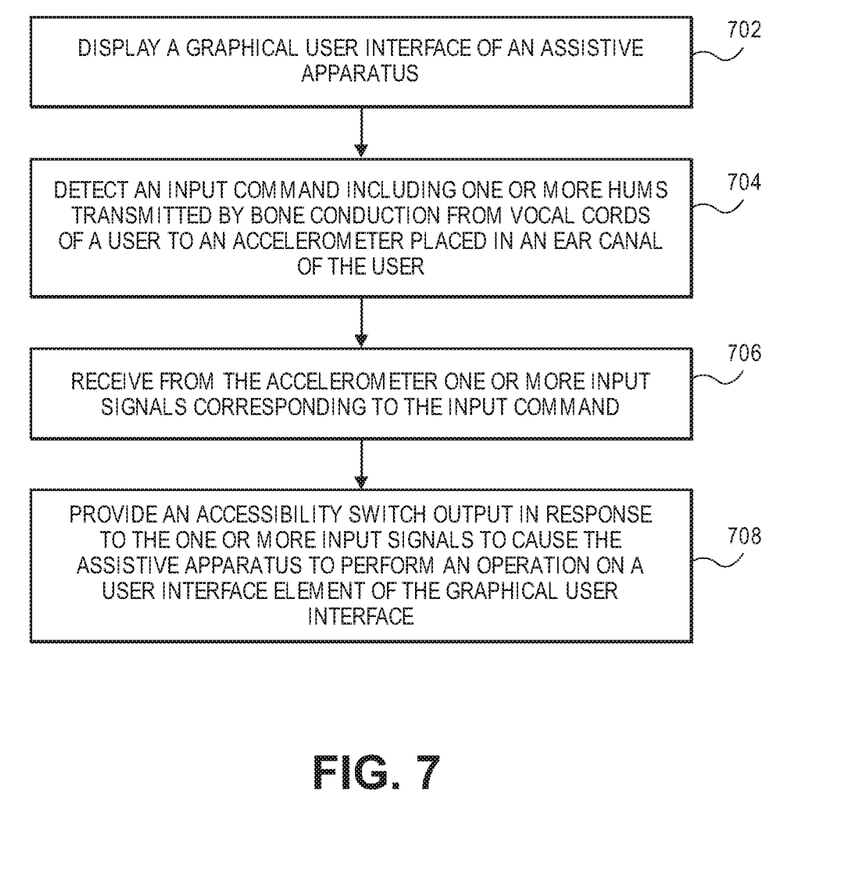
FIG. 7 is a flowchart of an accessibility method, in accordance with an embodiment.

Referring to FIG. 7, a flowchart of an accessibility method is shown in accordance with an embodiment. At operation 702, display 106 of assistive apparatus 100 may display graphical user interface 112 having one or more user interface elements 114. For example, graphical user interface 112 may include a segmented presentation of a website having image elements and hyperlink elements. User 208 may wish to advance through one or more image or hyperlink elements to select a target hyperlink, i.e., to navigate to a target webpage, or to perform an operation on a target image, e.g., to magnify (zoom in on) the target image.

At operation 704, to navigate through graphical user interface 112, user 208 may provide an input command to assistive apparatus 100. User 208 may make one or more hums and/or head tilts as portions of the input command. More particularly, user 208 may perform actions having audible and non-audible characteristics in a predetermined sequence to generate the input command. Accelerometer 204 of assistive apparatus 100 may detect the input command and the individual portions of the input command. For example, the one or more hums by user 208 may include wordless tones transmitted via bone conduction 209 from vocal cords of user 208 to accelerometer 204 in ear canal 206.

At operation 706, accelerometer 204 may communicate electrical vibration and/or orientation signals corresponding to the input command. That is, processor 304 of assistive apparatus 100 may receive the input signals corresponding to the input command through a wired or wireless connection with accelerometer circuitry of headset 104.

At operation 708, processor 304 may execute the accessibility module to provide an accessibility switch output to cause assistive apparatus 100 to perform an operation on the target user interface element 114. More particularly, processor 304 may provide the accessibility switch output in response to receiving the input signals.

Figure 8:
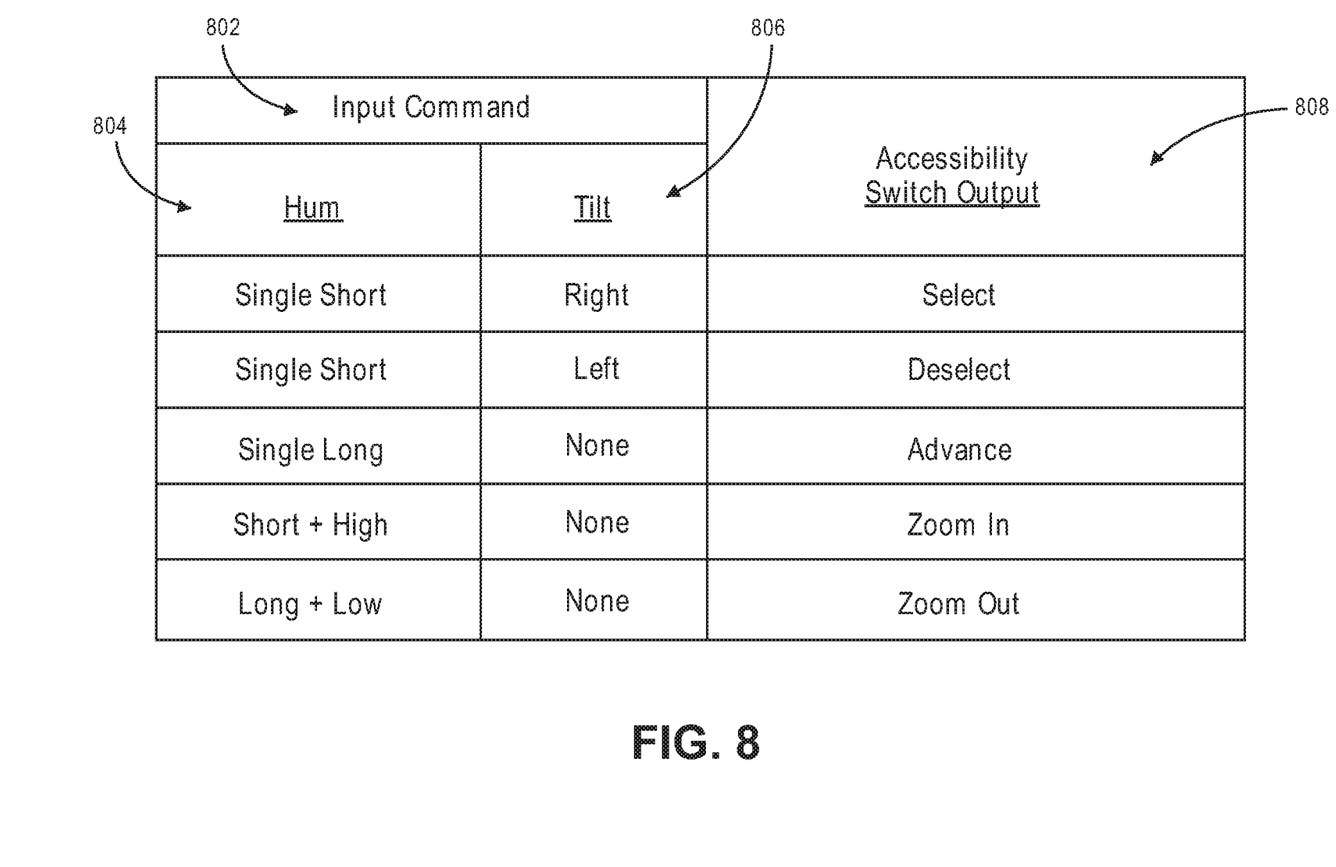
FIG. 8 is a table representing input commands mapped to respective accessibility switch outputs, in accordance with an embodiment.

Referring to FIG. 8, a table representing input commands mapped to respective accessibility switch outputs is shown in accordance with an embodiment. The accessibility module may be an accessibility feature of an operating system of assistive apparatus 100. More particularly, the accessibility module may map an input command 802 detected by accelerometer 204 to an accessibility switch output 808. As described above, the input signals generated by accelerometer 204 may include one or more electrical vibration and orientation input signals corresponding to the input command 802 by user 208. That is, a particular input command 802 may include one or more hum inputs 804 and/or one or more tilt inputs 806. A combination of the hum inputs 804 and tilt inputs 806 may be mapped to a corresponding accessibility switch output 808 by the accessibility module. Accordingly, processor 304 may receive the input signals and execute the accessibility module to map the one or more input signals generated by accelerometer 204 to accessibility switch output 808. Thus, a component of assistive apparatus, e.g., processor 304, may provide the accessibility switch output 808.

By way of example, the first row of the table indicates a particular input command 802 including a combination of a single short hum and a head tilt toward a right side of a vertical plane. As described above, the single short hum may have a prerequisite audio power, and a constant tone over a short duration. The accessibility module may map the particular combination of inputs to a "select" accessibility switch output 808. More particularly, in response to the input signals, processor 304 may provide an accessibility switch output to cause assistive apparatus 100 to select the target user interface element 114. It will be appreciated that other input commands 802 including different input signals may map to respective accessibility switch outputs 808 that cause assistive apparatus 100 to perform other operations. For example, the respective accessibility switch output 808 may cause assistive apparatus 100 to advance cursor 116 from user interface element 114 to second user interface element 118, which may be a target user interface element. Similarly, the respective accessibility switch output 808 may cause assistive apparatus 100 to magnify the target user interface element on display 106.

The particular input commands 802 and corresponding accessibility switch outputs 808 shown in FIG. 8 are provided by way of example and not limitation. For example, a first input command may include a head tilt in a direction that user 208 wishes cursor 116 to move in graphical user interface 112, and a second input command may include a hum 210 of a predetermined duration or pitch to cause selection of user interface element 114 underlying cursor 116 in graphical user interface 112. Thus, electrical orientation signals from accelerometer 204 may be mapped to accessibility cursor controls, and electrical bone conduction vibration signals from accelerometer 204 may be mapped to accessibility user interface element manipulation controls.

The range of operations that may be controlled based on accelerometer 204 of assistive apparatus 100 may also vary. For example, given that complex switches can be generated based on intensity, pitch, and duration of vocal cord vibrations captured by accelerometer 204, complex outputs such as alphanumeric typing on graphical user interface 112 may be performed. As described above, in a non-limiting embodiment provided by way of example, a 5 bit data input may be generated by combining hum and tilt inputs. Such combination are sufficient, for example, to be mapped to every letter in the Roman alphabet. Thus, user 208 may type using a combination of memorized hums and head tilts. The typing process may be eased by combining the accessibility features described above with predictive text technologies. Thus, input commands 802 provided to accelerometer 204 may be transformed into single accessibility switches (1-0 control) or complex switches and control signals.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    displaying, by a display of an assistive apparatus, a graphical user interface having a user interface element;
    receiving, by one or more processors of the assistive apparatus, one or more input signals generated by an accelerometer;
    determining, by the one or more processors of the assistive apparatus, that the one or more input signals represent an input command including one or more vocalizations having respective durations made by a user, wherein each of the respective durations is more than a selected threshold; and
    providing an accessibility switch output corresponding to the input command, wherein the accessibility switch output causes the assistive apparatus to perform an operation on the user interface element.

2. The method of claim 1, wherein each vocalization is a hum having a respective frequency that is constant over the respective duration.

3. The method of claim 2, wherein the respective frequencies are less than 1 kHz, and wherein the selected threshold is 60 milliseconds.

4. The method of claim 1, wherein the one or more vocalizations include a combination of a plurality of vocalizations.

5. The method of claim 4, wherein the combination includes a first vocalization having a first pitch, and a second vocalization having a second pitch lower than the first pitch.

6. The method of claim 4, wherein the combination includes a first vocalization having a first duration, and a second vocalization having a second duration longer than the first duration.

7. The method of claim 1 further comprising determining that the one or more input signals represent the input command including a tilt of an ear canal of the user.

8. The method of claim 1 further comprising mapping, by the one or more processors of the assistive apparatus, the one or more input signals to the accessibility switch output.

9. The method of claim 1, wherein the operation includes one or more of selecting the user interface element, magnifying the user interface element on the display, or advancing a cursor from the user interface element to a second user interface element of the graphical user interface.

10. A non-transitory machine-readable storage medium having instructions which, when executed by a processor of an assistive apparatus, causes the assistive apparatus to perform a method comprising:
    displaying, by a display of an assistive apparatus, a graphical user interface having a user interface element;
    receiving, by one or more processors of the assistive apparatus, one or more input signals generated by an accelerometer;
    determining, by the one or more processors of the assistive apparatus, that the one or more input signals represent an input command including one or more vocalizations having respective durations made by a user, wherein each of the respective durations is more than a selected threshold; and
    providing an accessibility switch output corresponding to the input command, wherein the accessibility switch output causes the assistive apparatus to perform an operation on the user interface element.

11. The non-transitory machine-readable storage medium of claim 10, wherein the one or more vocalizations include a combination of a plurality of vocalizations, and wherein each vocalization has a respective frequency that is constant over the respective duration.

12. The non-transitory machine-readable storage medium of claim 11, wherein the combination includes a first vocalization having a first pitch less than 1 kHz, and a second vocalization having a second pitch lower than the first pitch.

13. The non-transitory machine-readable storage medium of claim 11, wherein the combination includes a first vocalization having a first duration longer than the selected threshold of 60 milliseconds, and a second vocalization having a second duration longer than the first duration.

14. The non-transitory machine-readable storage medium of claim 10 further comprising determining that, the one or more input signals represent the input command including a tilt of an ear canal of the user.

15. An assistive apparatus having accelerometer-based accessibility, comprising:
    an earphone configured to be worn in an ear canal of a user, wherein the earphone includes an accelerometer configured to generate one or more input signals representing an input command including one or more vocalizations having respective durations made by the user, and wherein each of the respective durations is more than a selected threshold;
    a display configured to display a graphical user interface having a user interface element;
    a memory storing an operating system having an accessibility module configured to map the one or more input signals to an accessibility switch output; and
    one or more processors configured to:
        receive the one or more input signals generated by the accelerometer,
        determine that the one or more input signals represent the input command,
        execute the accessibility module to map the one or more input signals to the accessibility switch output, and
        provide the accessibility switch output to cause the assistive apparatus to perform an operation on the user interface element.

16. The assistive apparatus of claim 15, wherein each vocalization has a respective frequency that is constant over the respective duration.

17. The assistive apparatus of claim 16, wherein the respective frequencies are less than 1 kHz, and wherein the selected threshold is 60 milliseconds.

18. The assistive apparatus of claim 17, wherein the one or more vocalizations include a combination of a plurality of vocalizations made by the user.

19. The assistive apparatus of claim 18, wherein the one or more vocalizations include a tilt of the ear canal of the user.

20. The assistive apparatus of claim 15 further comprising a headset having the earphone, wherein the headset is configured to play audio from the earphone into the ear canal, and wherein the headset includes a microphone configured to receive a voice of the user.

* * * * *